Jan. 4, 1949.  H. A. SCHOFIELD  2,457,836
JOINT
Filed April 20, 1945
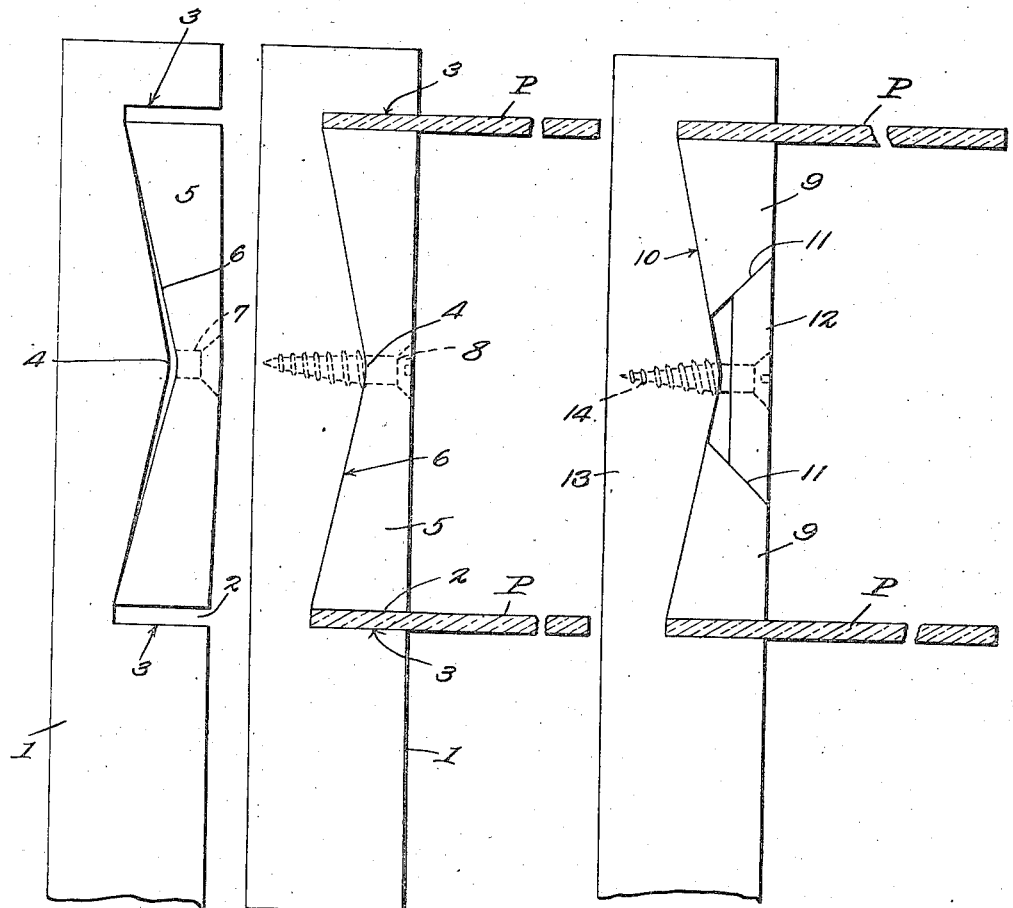
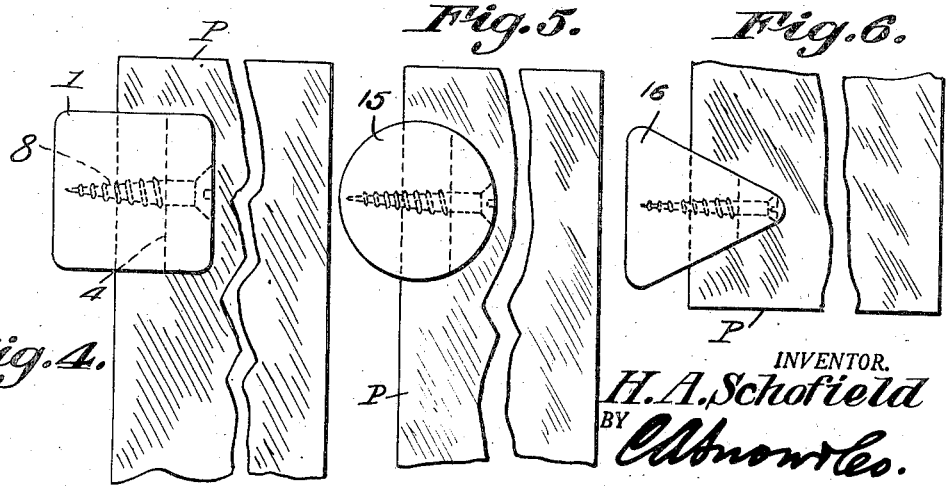
INVENTOR.
H. A. Schofield
BY
ATTORNEYS.

Patented Jan. 4, 1949

2,457,836

UNITED STATES PATENT OFFICE 2,457,836

JOINT

Hazen A. Schofield, San Francisco, Calif.

Application April 20, 1945, Serial No. 589,289

3 Claims. (Cl. 20—0.5)

This invention relates to a joint whereby parts of shelving, furniture, etc., can be held together securely, the invention being more especially applicable to the construction of tables, etc., utilizing glass panels as parts of their construction.

An object of the invention is to provide an expansible joint element which, when tightened in proper position, will exert a clamping action upon a panel or the like positioned within one end portion of the joint, thereby avoiding the danger of breaking the glass or other material being secured.

A still further object is to provide a joint, the parts of which can be loosened easily for the purpose of removing and replacing panels, etc.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred forms of the invention have been shown.

In said drawings:

Figure 1 is a section through a structural member having an expansible clamping element positioned loosely therein.

Figure 2 is a similar view showing the clamping element secured tightly in position and utilized for holding glass panels to the structural element.

Figure 3 is a view similar to Figure 2 showing a modified structure.

Figure 4 is a top plan view of the structure shown in Figure 2.

Figure 5 is a top plan view of a modified form of structural elements provided with the clamping means shown in Figures 1 and 2.

Figure 6 is a top plan view of another modification.

Referring to the figures by characters of reference, 1 designates a structural element which can be made of wood or other suitable material, and can be of any desired proportions. In the present instance this structural element is in the nature of a post or leg substantially rectangular in cross section. In one face of this element there is provided a recess 2 having end shoulders 3 which can be disposed at any angles desired relative to the longitudinal center of the element. In the present instance, they are parallel and at right angles to the longitudinal center of the structural element. The inner surface of the recess is not straight from end to end but has a transverse intermediate ridge 4 from which the bottom of the recess diverges inwardly or backwardly toward the shoulders 3.

The clamping element illustrated in Figures 1 and 2 comprises an elongated block 5, the length of which is somewhat less than the length of the recess 2. That face of the clamping element which is nearest the inner surface of the recess has surfaces 6 converging toward each other at an angle less than that formed by the diverging surfaces of the recess 2 so that when the clamping element is placed in the recess 2, it will contact therewith only at the ends of the clamping element, while between said ends the parts will be spaced apart as clearly shown in Figure 1.

When the clamping element is in its normal shape, as in Figure 2, its ends are spaced from the shoulders 3 sufficient distances to receive the panels P or the like to be assembled with the structural element 1. In the illustrated device, these panels are formed of glass but obviously they could be made of other materials such as wood, plastic, etc.

In assembling the structure, the panels P are inserted in the end portions of the recess 2 after which the clamping element 5 is placed in position therebetween. This clamping element has a central opening 7 which is designed to receive a screw 8 which is driven into the element 1. As the screw is tightened the clamping element 5, is pressed back into the recess so as to cause the surfaces 6 to approach the diverging surfaces of the recess 2. Consequently, the clamping element 5 will become slightly elongated and this elongation will be sufficient to cause said element to press firmly against the inserted portions of the panels P and bind them against the shoulders 3.

Instead of utilizing a one-piece clamping element as shown in Figures 1 and 2, said element can be made of end members 9 to be positioned in the respective end portions of the recess 10. Those ends of the members 9 nearest to one another are beveled as at 11. A wedging block 12 having beveled ends, is insertable between the beveled ends 11 and is adapted to be held to the structural member 13 by a screw 14 or the like. Obviously, after the panels P have been placed in position within the end portions of the recess 10, the clamping blocks 9 are inserted in the recess with the wedging block or element 12 between and, by tightening the screw 14, this wedging block can be drawn toward the inner wall of the recess 4, thus forcing the clamping blocks or end members 9 firmly against the panels P so as to secure them in position.

It is to be understood, of course, that the structural element 1 can be of any desired shape. They can be substantially rectangular, as shown in Figure 4, or cylindrical, as indicated at 15 in Figure 5, or triangular in cross section as indicated at 16 in Figure 6. In every case, the panels can be held thereto by either of the means which have been illustrated in Figures 1-3 inclusive.

It has been found that this structure is especially useful where mirrors, glass panels, etc., are to be assembled with different type of structural elements, such as the frames and/or legs of tables, the connecting strips or supports of shelves, etc.

What is claimed is:

1. In an article of knock-down furniture a structural element having an elongated recess terminating at opposed shoulders, the inner wall of the recess having surfaces converging to a peak, whereby the recess gradually increases in depth from said peak to the respective shoulders, panel elements bearing against the respective shoulders and extending straight into the recess, spacing means interposed between the panel elements and positioned in the recess, said spacing means having a recess the walls of which converge along straight lines at an angle of lesser degree than the angle of the converging surfaces of the first-named recess whereby, when the said spacing means is positioned in the first-named recess and between the panels, the middle portion thereof will be spaced from the peak in the first-named recess, and means accessible between the panels for drawing the middle portion of the recessed spacing means toward the inner wall of the recess in the structural element, thereby to distort the spacing means and expand it longitudinally to bind upon the inserted panels.

2. In an article of knock-down furniture a structural element having an elongated recess terminating at opposed shoulders, the inner wall of the recess having surfaces converging to a peak, whereby the recess gradually increases in depth from said peak to the respective shoulders, panel elements bearing against the respective shoulders and extending straight into the recess, spacing means interposed between the panel elements and positioned in the recess, said spacing means having a recess the walls of which converge along straight lines at an angle of lesser degree than the angle of the converging surfaces of the first-named recess whereby, when the said spacing means is positioned in the first-named recess and between the panels, the middle portion thereof will be spaced from the peak in the first-named recess, and means accessible between the panels for drawing the middle portion of the recessed spacing means toward the inner wall of the recess in the structural element, thereby to distort the spacing means and expand it longitudinally to bind upon the inserted panels, said accessible means being adjustable to release the compression on the spacing means to permit natural retraction thereof in the direction of its length.

3. In an article of knock-down furniture a structural element having a longitudinal recess the inner wall of which has diverging flat faces merging at a high point in the recess and disposed at an obtuse angle to each other, panels extending into the end portions of the recess, the end walls of the recess providing gripping shoulders for engagement by the respective panels, spacing means interposed between the panels and seated in the recess, said spacing means having a recess the walls of which converge along straight lines to form an angle of lesser obtuseness than the first-named angle, whereby to space the middle portion of the inserted spacing means from the high point of the first-named recess, and an adjusting means accessible between the panels adapted to draw the middle portion of the spacing means toward the inner wall of the first-named recess, for distorting the inserted means to bind the panels against the respective shoulders and for releasing said panels from the binding action, said panels being extended straight into the recess between the shoulders and the spacing means.

HAZEN A. SCHOFIELD.

REFERENCES CITED

The following references are of record in the file of this patent:

UNITED STATES PATENTS

| Number | Name | Date |
| --- | --- | --- |
| 530,314 | Williams | Dec. 4, 1894 |
| 1,407,250 | Burnett | Feb. 21, 1922 |

FOREIGN PATENTS

| Number | Country | Date |
| --- | --- | --- |
| 203,204 | Switzerland | 1939 |